(No Model.) 3 Sheets—Sheet 1.
W. BAYLEY.
LAWN MOWER.
No. 513,752. Patented Jan. 30, 1894.
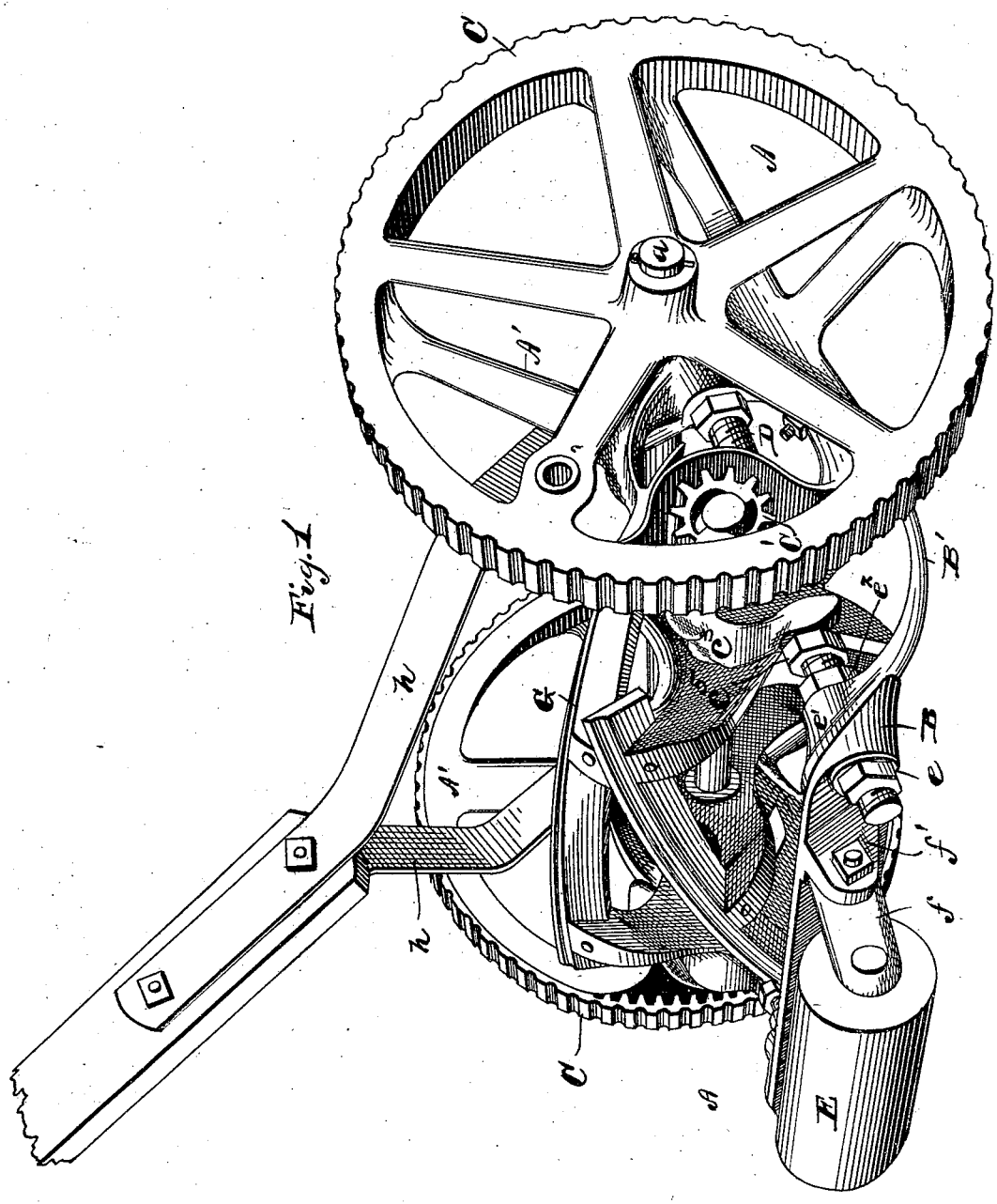
WITNESSES:
Frank Watt
Jas. M. Smith
INVENTOR
William Bayley
BY Stratford Shephard
ATTORNEYS

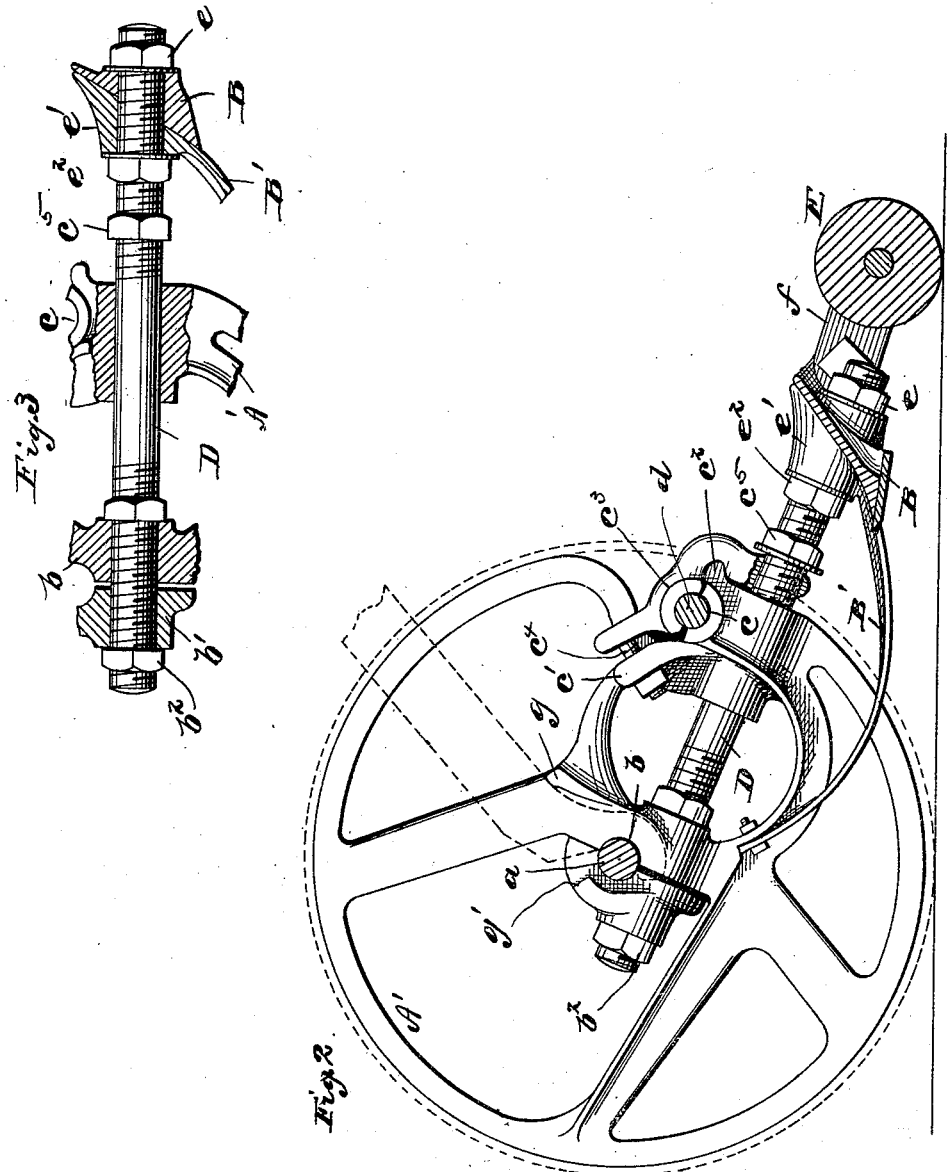

(No Model.) 3 Sheets—Sheet 3.
W. BAYLEY.
LAWN MOWER.
No. 513,752. Patented Jan. 30, 1894.
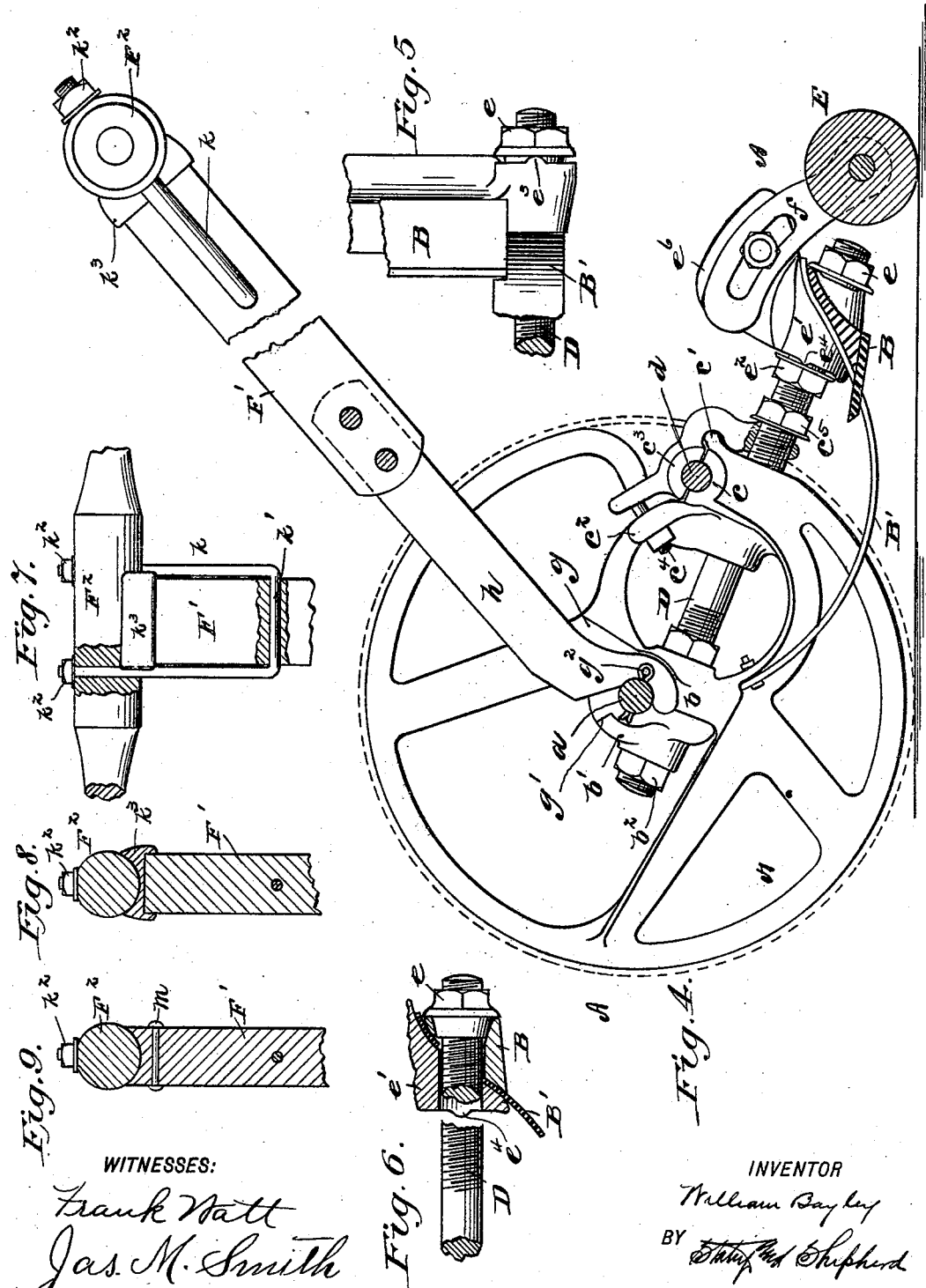
WITNESSES:
Frank Watt
Jas. M. Smith
INVENTOR
William Bayley
BY Staty and Shepherd
ATTORNEYS

UNITED STATES PATENT OFFICE.

WILLIAM BAYLEY, OF SPRINGFIELD, OHIO.

LAWN-MOWER.

SPECIFICATION forming part of Letters Patent No. 513,752, dated January 30, 1894.

Application filed February 11, 1893. Serial No. 461,936. (No model.)

*To all whom it may concern:*

Be it known that I, WILLIAM BAYLEY, a citizen of the United States, residing at Springfield, in the county of Clark and State of Ohio, have invented certain new and useful Improvements in Lawn-Mowers, of which the following is a specification.

My invention relates to improvements in lawn mowers; and the object of my invention is to provide a lawn mower of simple and novel construction, the parts of which may be readily and easily assembled and easily and accurately adjusted.

My invention consists in the various constructions and combinations of parts hereinafter described and pointed out in the claims.

In the accompanying drawings Figure 1 is a perspctive view of a lawn mower embodying my invention. Fig. 2 is a transverse sectional view of the same, with one of the wheels and a portion of the handle shown in dotted lines. Fig. 3 is a sectional view of some of the frame portions and their connecting and adjusting devices in detail. Fig. 4 is a transverse sectional view of the machine, showing some of the parts slightly modified. Figs. 5 and 6 are details of the same. Figs. 7 to 9, inclusive, are details of the handle.

Like parts are represented by similar letters of reference in the several views.

In the said drawings A A, represent the main frame which consists essentially of frame pieces A', preferably of skeleton form and arranged at each side of the main frame and connected together by a central rod or shaft $a$. The frame pieces A', are each formed with an outer periphery having a projecting flange or shield slightly smaller in diameter than the inside of the driving wheels C, which are journaled on the outer extremities of the shaft $a$, and provided with the usual gear teeth which engage pinions C', on the reel shaft in the usual way. The frame pieces A', are each formed integral with open bearings $b$ $c$, adapted to receive the stationary connecting shaft $a$, and the revolving reel or cutter shaft $d$, respectively. Immediately below each of these bearings $b$ and $c$, each frame piece A', is enlarged into a boss which is perforated to receive a connecting rod D, at right angles to the respective shafts $a$ and $d$. This connecting rod is screw-threaded at each end and extends through the perforated bosses of the frame pieces and serves to support each end of the stationary cutter B, and connect the same to the frame piece, as will hereinafter more fully appear. The open bearing $b$, is provided with a cap $b'$, which is also formed with a boss perforated to slip over the connecting rod D, and is held firmly thereon and against the stationary connecting shaft $a$, by a nut $b^2$, on the connecting rod, by means of which the said cap may be drawn securely against the stationary shaft $a$, and thus secure the same. The open bearing $c$, is provided on one side with an extended lug $c'$, and on the opposite side with a projection $c^2$. It is adapted to be closed by an L-shaped cap $c^3$, the respective ends of which are perforated, one end being adapted to receive the connecting rod D, and the other a retaining bolt $c^4$, which passes through the lug $c^2$.

The outer periphery of the frame piece A', is formed circular to conform to the inner diameter of the driving wheel except at the point immediately above the bearing $c$, of the reel shaft, at which point the outer periphery is curved inwardly to form an opening through which the reel shaft may be readily inserted in or removed from its bearings $c$, when the driving wheels and the respective bearing caps are removed. An adjusting nut $c^5$, on the screw-threaded portion of the connecting rod D, bearing against the perforated end of the bearing cap, serves in connection with the bolt $c^4$, and projection $c^3$, to adjust the said cap $c^3$, upon the reel shaft, and thus furnish the means for taking up any wear and preventing undue friction thereon.

The stationary cutter B, is connected to the main frame A A, by the connecting rods D, as above noted; curved projecting fingers B', being also preferably employed between the stationary cutter and each frame piece, as shown. It will be understood that the ends of the stationary cutter are perforated to receive the connecting rod D; a nut $e$, on said rod, being adapted to bear against one side of said stationary cutter. The opposite side of said cutter is formed on an angle and is adapted to contact with a collar $e'$, formed on a corresponding angle and also perforated to receive the connecting rod D. A nut $e^2$, also on the connecting rod, serves, in connection with the adjusting nut $e$, to adjust the cutter to or from the frame or secure it firmly in position; the angular bearing between the collar $e'$, and stationary cutter being adapted to wedge the respective parts laterally in opposite directions firmly against the connecting rod D, and thus take up all play and hold the same firmly against lateral movement.

The fingers B', may be cast integral with the collars $e'$, of malleable iron or other flexible material which will yield slightly to permit a limited adjustment of the stationary cutter to or from the reel, as shown in Fig. 2, or they may be made separate and perforated to receive the rods D, with the ends resting between the collars and stationary cutter, as shown in Figs. 4 and 6.

A supporting roller E, is preferably connected to the rear of the stationary cutter by suitable connecting arms $f$, which may be bolted or otherwise secured to projecting lugs $f'$, at the rear of said cutter, as shown in Fig. 2. This is preferably accomplished, however, by providing the collar $e'$, with projecting lugs or ears $e^6$, to which the connecting arms $f$, of the roller E, are bolted; the arms being preferably formed slightly curved and slotted in a well known manner to secure the proper adjustment of the roller, as illustrated in Fig. 4.

Each of the frame pieces A', is provided on the inside with a projecting lug or stop projection $g$, the cap or cover $b'$, of the bearing $b$, being provided with an oppositely arranged projection $g'$. The handle F, is provided with the usual bail pieces $h$. These bail pieces are formed at their extremities with a hook-shaped bearing adapted to engage over the stationary shaft $a$, after which they are slipped laterally on said shaft so as to rest between the respective stop projections $g\ g'$, and are held against further lateral movement on the shaft by a split key $g^2$, or its equivalent, which passes through said shaft; the construction as thus described being such as will permit the handle to be readily removed or replaced and at the same time, when connected to the frame, be capable of a limited movement about the shaft, determined by the stop projections $g\ g'$, to raise or lower the same.

The revolving cutter reel G, is mounted rigidly on the shaft $d$, and operates in connection with the stationary cutter in the usual way; the power to drive the same being transmitted from the driving wheels C, through the medium of the pinions C', having suitable clutch devices to cause them to operate in one direction only in the ordinary manner.

The handle is formed essentially of a straight bar F', and a cross bar F², at the outer end thereof. The cross bar F², is secured to the longitudinal bar F', preferably by means of a U-shaped connection $k$, which passes through an opening $k'$, in the bar F', with the outer extremities passing laterally through the cross bar F², which is secured by nuts $k^2$, on the outer ends of said connection, which are screw-threaded for that purpose. A metallic socket $k^3$, adapted to fit over the end of the longitudinal bar F', and provided with a concave bearing seat to receive the bar F², is preferably provided between the respective parts. If desired, however, the metallic socket $k^3$, may be dispensed with; the end of the longitudinal bar F', being hollowed out to receive the rounded portion of the transverse bar F², as shown in Fig. 9; a rivet or bolt $m$, being preferably extended through said bar to prevent splitting, as shown in Fig. 9. In either case it will be seen that when the nuts $k^2$, are tightened the cross bar is firmly attached to the end of the longitudinal bar F', and in the event of shrinkage can be readily tightened by turning up the nuts $k^2$.

In order to prevent cramping of parts and to assist in securing a perfect alignment of the stationary cutter, I preferably form said stationary cutter at each end with small projecting lugs or raised portions $e^3$, on opposite sides of the connecting rod D, so that the nuts $e$, will bear only against this raised surface which is slightly rounded, as shown. The collars $e'$, which bear against said stationary cutter are also preferably provided with similar projections $e^4$, but at right angles to those on the stationary cutter. The result of this construction is to permit the proper independent movement of the opposite ends of the cutter to secure the proper alignment without any undue straining of parts, as the construction will permit the respective nuts to adjust themselves readily to the bearing seats on the cutter and collar in any position which said cutter will assume in the ordinary adjustment thereof.

It will be seen that by the constructions described I secure a lawn mower extremely simple in arrangement and adjustment of parts. By the use of the frame pieces and the connecting rods, in connection with the stationary cutter, I produce a frame the parts of which are susceptible of ready adjustment and capable of being constructed and assembled without the aid of special tools and with but little machine work. By the use of the L-shaped bearing caps $c^3$, and the projections $c^2$, each of the caps acts as a lever, fulcrumed at $c^2$, which, by the aid of the bolt $c^4$, at one end, and nut $c^5$, at the other, may be readily adjusted to any desired position and held firmly in any position of adjustment. By the constructions described and shown the stationary cutter may not only be adjusted to or from the reel, as desired, but by the use of the angularly arranged faces on said cutter and the collar or washer $e'$, the parts, when tightened together, are forced firmly against the connecting rod $a$, in opposite directions, so as to take up all lateral play and hold the respective parts firmly against lateral movement.

Having thus described my invention, I claim—

1. In a mower, the combination with the main frame supporting the rotary cutter or reel, of a stationary cutter connected to said frame by screw-threaded connecting rods adapted to support said stationary cutter, and means, substantially as described, for adjusting and locking said bar on said connecting rods, substantially as specified.

2. In a lawn mower a frame consisting essentially of frame pieces connected together by a central shaft which is clamped to said frame pieces by means of connecting rods and caps, said connecting rods extending rearwardly from said frame pieces and supporting the stationary cutter, substantially as specified.

3. In a lawn mower, the combination with the main axle, a reel shaft and a stationary cutter, of screw threaded connecting rods D, and screw threaded devices operating in connection with said rods to clamp the axle, secure the reel shaft and to hold and adjust the stationary cutter with reference to the said reel shaft, substantially as and for the purpose specified.

4. In a mower, a main frame and a stationary cutter, a connecting rod for connecting said stationary cutter to said main frame, and a collar on said rod adjacent to said cutter, said collar and cutter being provided with contacting bearing surfaces inclined to the axis of said connecting rod, substantially as and for the purpose described.

5. In a mower, a main frame and a cutter bar, connecting rods forming a part of said frame and adapted to support and secure said cutter bar to said frame, said cutter bar being provided with extended lugs, and a roller connected to said lugs and further provided at each end with perforations threaded on said connecting rods, substantially as specified.

6. In a lawn mower frame, frame pieces each formed with an open bearing, a connecting rod extending through a perforated opening below and in proximity to said bearing, a stationary cutter supported by said connecting rod, an L-shaped cap for said bearing, having a perforation threaded on said connecting rod, and adjusting nuts on said rod to hold and adjust said cap, substantially as specified.

7. In a lawn mower frame, a frame piece and a stationary cutter, said frame piece and cutter being joined together by a screw-threaded connecting rod, an open bearing for the reel shaft formed in a plane at right angles to and in proximity to said connecting rod, and a fulcrumed cap or cover for said bearing perforated at one end to receive said connecting rod and provided with an adjusting screw at the opposite end, substantially as specified.

8. The combination with the skeleton frame having the screw-threaded connecting rod, as described, of a stationary cutter perforated to receive said connecting rod, adjusting nuts on each side of said stationary cutter, and an interposed collar or washer between said cutter and one of said adjusting nuts, said collar and cutter being provided with angularly arranged faces, substantially as and for the purpose specified.

9. In a lawn mower, a skeleton frame piece formed with an outer periphery with the projecting flange adapted to form a shield for the driving gear of the driving wheel, said frame being provided with open bearings for a central stationary shaft and the reel shaft respectively, a connecting rod below and in proximity to said bearings, said rods being screw-threaded and provided with adjusting nuts, as described, caps or covers for said axle and reel shaft bearings, each of which is perforated to receive said connecting rod and be operated by said adjusting nuts, substantially as specified.

10. In a lawn mower the combination with the central stationary shaft and the end frame, as described, of the handle having projections with open hook shaped ends adapted to engage said shaft, and stop projections on said frame to limit the movement of said handle, and means, substantially as described, to prevent lateral movement of said handle on said stationary shaft, substantially as specified.

11. The combination with the stationary shaft, the frame pieces secured thereto, the screw-threaded connecting rod in said frame pieces, a cap or bearing plate on said connecting rod adapted to be clamped against said stationary shaft by nuts on said connecting rod, a reel shaft also having a bearing in said end pieces, and an L shaped cap or cover fulcrumed on said bearing and perforated to receive said connecting rod, means on said rod for holding said cap a stationary cutter also perforated to receive said connecting rod and having adjusting nuts on opposite sides thereof, whereby the operating parts are held firmly together by said connecting rod and at the same time capable of adjustment thereon, substantially as specified.

12. In a lawn mower, a main frame and a stationary cutter, connecting rods for connecting and securing said stationary cutter to said frame, said stationary cutter being perforated to receive said rods, clamping nuts on each of said rods on opposite sides of said cutter, and raised bearing projections adapted to contact with said clamping nuts, said raised bearing projections, at opposite sides of said cutter, being arranged in axial planes at right angles to each other, substantially as specified.

13. In a handle for lawn mowers, consisting essentially of a longitudinal bar and a cross bar, said longitudinal bar being provided at the end with a socket to receive said transverse bar, which is formed to fit therein, and a U-shaped connecting piece adapted to extend through said longitudinal bar with the projecting ends passing through said transverse bar, and means for tightening said transverse bar on said connecting piece so as to clamp the same into the socket formed in said longitudinal bar, substantially as specified.

14. A handle for lawn mowers formed of a longitudinal bar and a transverse bar, a metallic socket adapted to embrace the end of said longitudinal bar and provided with a concave bearing seat for said transverse bar, and a U-shaped connection adapted to extend through said longitudinal bar with its projecting ends passing through said transverse bar, and nuts on the projecting ends of said connection, whereby the respective parts are clamped firmly together, substantially as specified.

In testimony whereof I have hereunto set my hand this 4th day of February, A. D. 1893.

WILLIAM BAYLEY.

Witnesses:
OLIVER H. MILLER,
FRANK WATT.